(12) United States Patent
Koike

(10) Patent No.: US 8,797,556 B2
(45) Date of Patent: Aug. 5, 2014

(54) PRINTING APPARATUS, PRINT CONTROL METHOD, AND PROGRAM

(75) Inventor: Hisashi Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/438,359

(22) Filed: Apr. 3, 2012

(65) Prior Publication Data

US 2012/0257232 A1    Oct. 11, 2012

(30) Foreign Application Priority Data

Apr. 8, 2011    (JP) .................................. 2011-086583

(51) Int. Cl.
*G06F 15/00* (2006.01)
*G06K 15/00* (2006.01)

(52) U.S. Cl.
USPC ........................... 358/1.12; 358/1.9; 358/1.16

(58) Field of Classification Search
USPC .................................. 358/1.12, 2.1, 1.9, 1.16
See application file for complete search history.

(56) References Cited

U.S. PATENT DOCUMENTS

| 8,009,302 B2 * | 8/2011 | Martin ......................... 358/1.13 |
| 8,194,256 B2 * | 6/2012 | Kobayashi .................. 358/1.12 |
| 2006/0012807 A1 * | 1/2006 | Bos et al. ...................... 358/1.8 |
| 2006/0029448 A1 * | 2/2006 | Fujinaga .......................... 400/76 |
| 2006/0206629 A1 * | 9/2006 | Sasaki et al. ...................... 710/8 |
| 2007/0146789 A1 * | 6/2007 | Mima et al. .................. 358/1.16 |
| 2009/0168096 A1 * | 7/2009 | Toda ............................ 358/1.15 |
| 2009/0279115 A1 * | 11/2009 | Martin ........................ 358/1.13 |
| 2009/0303502 A1 * | 12/2009 | Robinson et al. ............. 358/1.9 |
| 2010/0020342 A1 * | 1/2010 | Shibata .......................... 358/1.9 |
| 2011/0069330 A1 * | 3/2011 | Tanaka .......................... 358/1.9 |
| 2012/0099148 A1 * | 4/2012 | Tokura ........................ 358/1.15 |

FOREIGN PATENT DOCUMENTS

| JP | 2000-211213 A | 8/2000 |
| JP | 2002-091740 A | 3/2002 |
| JP | 2009-205257 A | 9/2009 |

\* cited by examiner

*Primary Examiner* — Jerome Grant, II

(74) *Attorney, Agent, or Firm* — Canon USA Inc IP Division

(57) ABSTRACT

A printing apparatus for performing job printing includes a reception unit configured to receive information about a print unit with respect to the job and information about an attribute of recording medium to be used in the print processing, and a printing unit configured to print the job using the recording medium by the print unit, using the information about the print unit received by the reception unit and the information about the attribute of the recording medium to be used in the print processing.

7 Claims, 16 Drawing Sheets

PRINTING APPARATUS, PRINT CONTROL METHOD, AND PROGRAM

BACKGROUND OF THE INVENTION

1. Field of the Invention

The present invention relates to a printing apparatus, a print control method, and a program.

2. Description of the Related Art

In recent years, printing apparatuses having a reprint function have been known. In reprint processing (hereinafter, referred to as reprint), contents of a printed job are stored, and the contents are printed again as necessary. Meanwhile, variable data printing or variable data publishing (VDP) has been known. In VDP, for example, as in case of direct mail, contents can be changed depending on the recipient. Generally, printing apparatuses having a VDP function insert variable information, such as an address stored on a database into a layout that is provided in advance, and perform the print processing. The printing apparatuses can perform the print processing by simply changing the addresses, or by changing images (contents) on the layout or paper to be used depending on information of a recipient. In the print processing in which the images or paper to be used are changed, the number of pages may change accordingly. Further, VDP print jobs are generally large jobs containing many records.

An example of where re-printing a print job would be a case where a print result is different from an intended one and not appropriate. In this instance, a user would typically execute the same print job again. In such a case, for example, as described in Japanese Patent Application Laid-Open No. 2000-211213, a method of reprinting only a specified page, odd pages, even pages, etc., instead of reprinting all pages is known. Further, for example, as described in Japanese Patent Application Laid-Open No. 2002-091740, a method of storing a page in which a jam occurred, or a page in which a paper-out condition occurred is known. In this method, only the relevant page is printed. Further, in a case where the print processing is performed normally, but improper paper is fed due to a wrong printing attribute, a method of putting a restriction to prevent changing the attribute and feeding of improper paper in performing reprint is known, as described in Japanese Patent Application Laid-Open No. 2009-205257.

In the above-described methods, printing apparatuses may use improper paper in the print processing when the printing apparatuses cannot recognize that the paper is improper. For example, it is assumed that a user sets colored paper in a paper feed stage, and a job using the colored paper is issued. However, after the print processing is finished, the user may find that, instead of red paper, orange paper was used instead. In such a case, when the same colored paper is used in the entire job, it is preferable to replace the incorrect colored paper with the correct colored paper and re-print the pages in questions. In VDP, when many records are printed in one job, in many cases, improper paper is used only in part of the job. In such a case, it is not preferable to re-print the entire job.

In the method discussed in Japanese Patent Application Laid-Open No. 2000-211213, the page to be reprinted can be specified and printed. However, in the example of printing using colored paper, it is not easy to visually look for the page where the orange paper is used and extract the associated page number(s). Further, in the VDP, the print processing is divided into record units and not serially numbered. Consequently, the mistakenly set paper is used in various records. Further, it is not uncommon that one job contains data of more than 500 pages. In such a job, it is not realistic to extract the page number. Further, the method in Japanese Patent Application Laid-Open No. 2002-091740 relates to an error that can be detected by the printing apparatus. In the method in Japanese Patent Application Laid-Open No. 2002-091740, after the print processing, with respect to a problem found by a user or an inspection device, it is necessary to issue the job again and print the data. Further, in the method in Japanese Patent Application Laid-Open No. 2009-205257, when the paper is simply mistakenly set, it is necessary to issue the job again and print the data.

SUMMARY OF THE INVENTION

One aspect of the present invention is directed to facilitate partial printing of a print job.

According to an aspect of the present invention, a printing apparatus for performing job print includes a memory, and a processor, coupled to the memory, the processor configured to control a reception unit configured to receive information about a print unit with respect to the job and information about an attribute of recording medium to be used in the print processing, and a printing unit configured to print the job using the recording medium by the print unit using the information about the print unit received by the reception unit and the information about the attribute of the recording medium to be used in the print processing.

According to the exemplary embodiments of the present invention, partial printing can be performed more easily.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

It is noted that the exemplary embodiments do not limit the scope of the present invention. Further, not all configurations described in the exemplary embodiments are necessary to solve the problems in the present invention. For description purposes, "paper" will be used to reference a recording media, however, any recording media that would enable practice of the exemplary embodiments is applicable.

Figure 1:
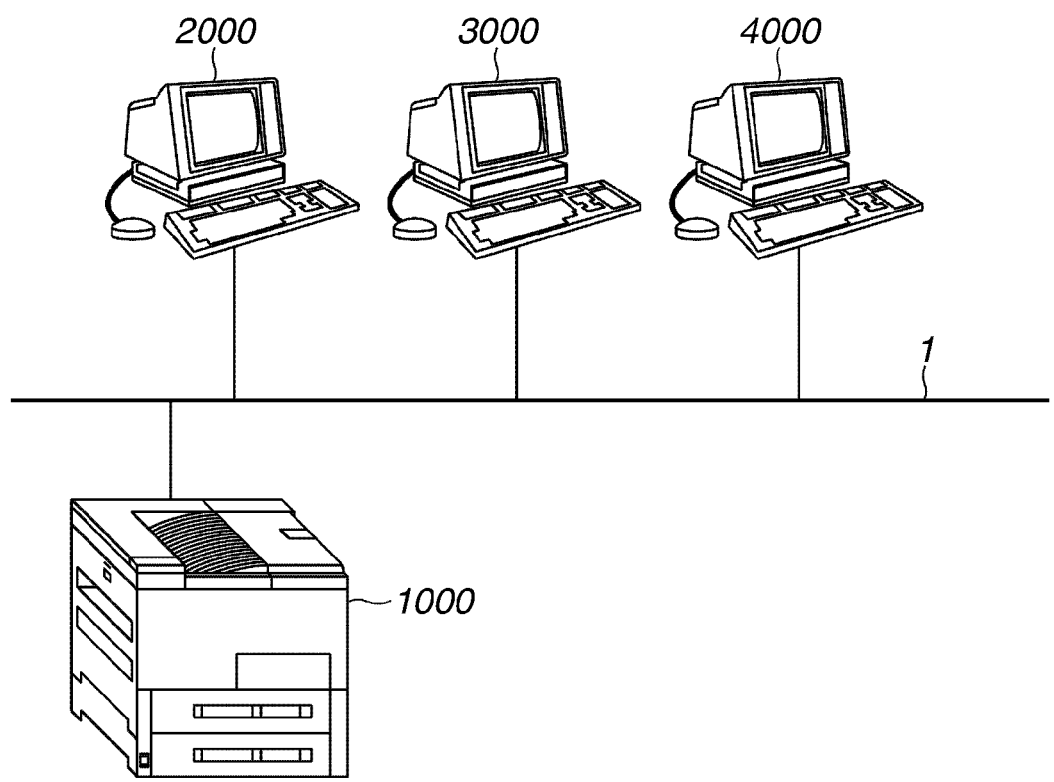
FIG. 1 illustrates an example of a configuration of a printing system.

FIG. 1 illustrates an example of a configuration of a printing system according to a first exemplary embodiment. The printing system includes a printing apparatus 1000 and a plurality of host computers 2000, 3000, and 4000. The printing apparatus 1000 and the host computers are communicably connected via a network 1. The host computers individually transmit a job to the printing apparatus 1000 via the network 1.

Figure 2:
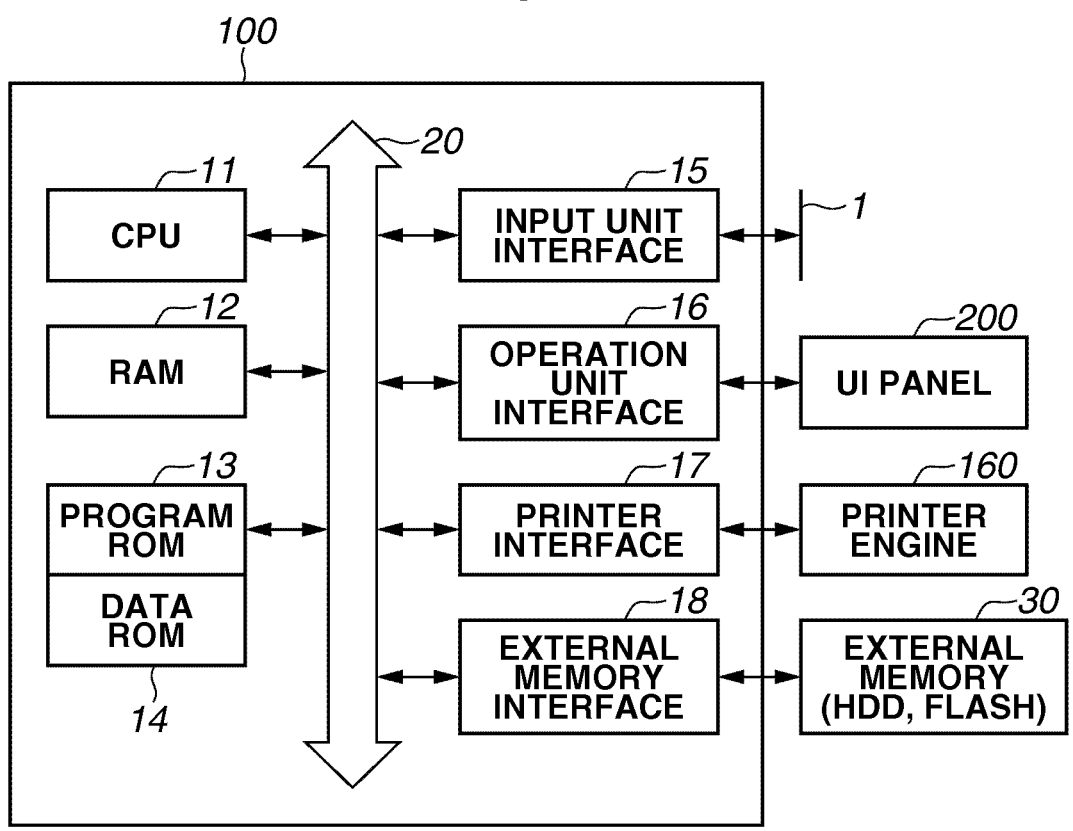
FIG. 2 illustrates an example of a hardware configuration of a controller.

FIG. 2 illustrates an example of a hardware configuration of a controller 100 provided in the printing apparatus 1000. The controller 100 is an example of an information processing apparatuses (computer). A central processing unit (CPU) 11 operates according to a program stored in a program read-only memory (ROM) 13. A random access memory (RAM) 12 is used as a main memory when the CPU 11 operates. The RAM 12 is used as an area for temporarily storing information. A data ROM 14 stores fixed information such as a font that is called when application of the program is executed by the CPU 11.

An input unit interface 15 receives information, such as a job, from the individual host computers connected to the network 1. An operation unit interface 16 connects a UI panel 200 with a controller 100. The UI panel 200 is an example of a display unit for displaying various types of information. A printer interface 17 connects a printer engine 160 with the controller 100. An external memory interface 18 connects an external memory 30, such as hard disk or a flash memory, with the controller 100. The external memory 30 is an example of the storage unit for storing various types of information. Individual units (11 to 18) are communicably connected via a system bus 20. A peripheral device, such as the external memory 30, can be provided in the printing apparatus 1000 or can be communicably connected to the printing apparatus 1000.

Figure 3:
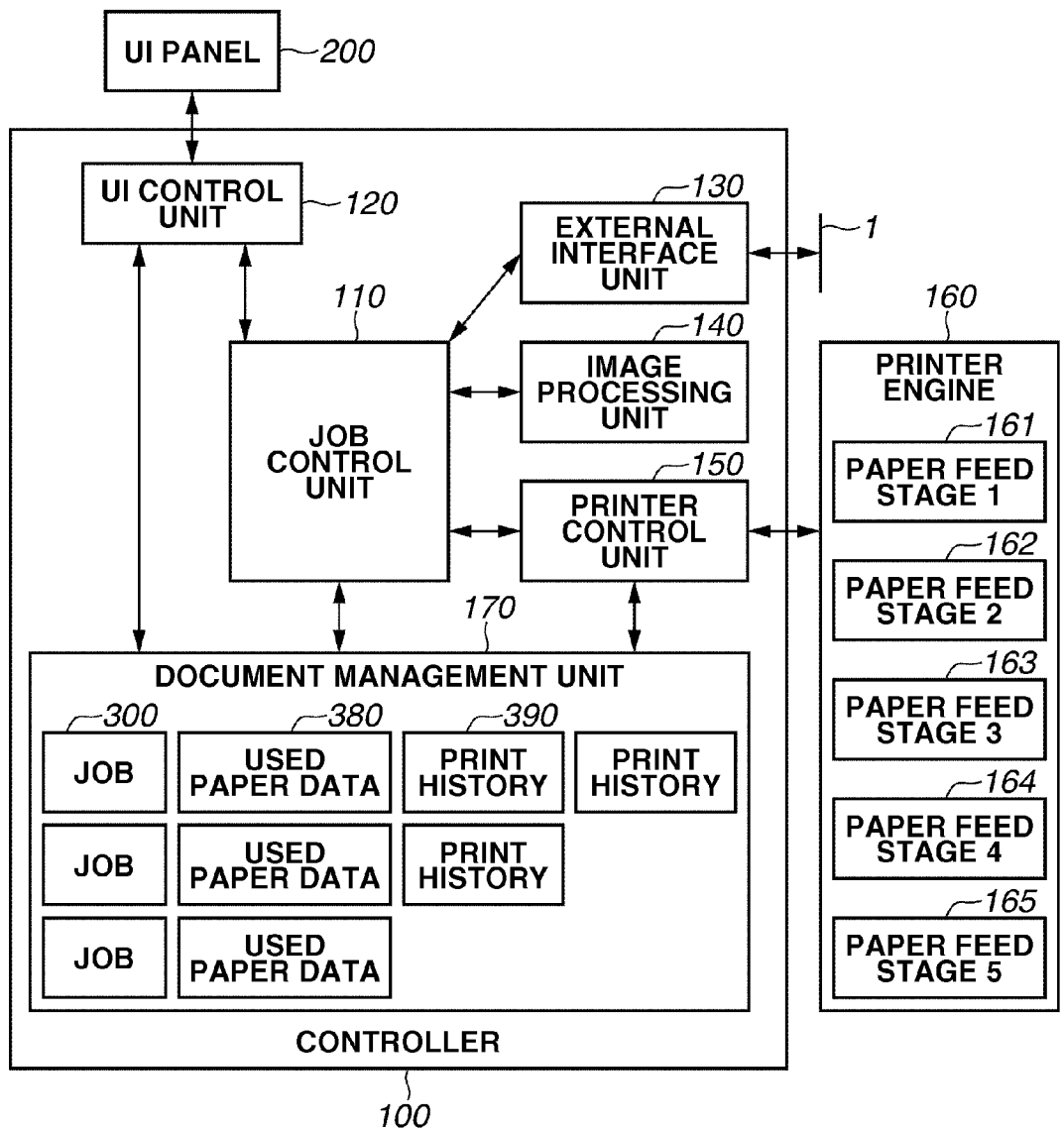
FIG. 3 illustrates an example of a functional configuration of a controller and a configuration relating to the functional configuration.

FIG. 3 illustrates an example of a functional configuration of the controller 100 provided in the printing apparatus 1000, and an example of a configuration relating to the functional configuration. A job control unit 110 controls processing relating to a job. A UI control unit 120 is an example of the reception unit for receiving various types of information. The UI control unit 120 controls the operation unit interface 16, and communicates with the UI panel 200. An external interface unit 130 controls the input unit interface 15. An image processing unit 140 forms an image of a page of a print job. A printer control unit 150 controls a printer interface 17. A printer engine 160 is controlled by the printer control unit 150 via a printer interface 17. Paper feed stages 161 to 165 are examples of the paper feeding units for storing paper, i.e., a storage unit for storing a recording medium).

A document management unit 170 stores and manages a job or the like. A job 300 is an example of the job stored in the external memory 30. Use data 380 of paper includes information about the paper to be used in the job 300. A print history 390 is information of a printing history of the job 300. In the present exemplary embodiment, the document management unit 170 stores and manages the data of the paper to be used and the print history in the external memory 30. In the present exemplary embodiment, the functions of the printing apparatus 1000 and processing according to flowcharts described below are implemented by the CPU 11 reading a program relating to the individual modules 110, 120, 130, 140, 150, and 170 from a program ROM 13 and executing the program. A part of or all of the functions of the printing apparatus 1000 and the processing according to the flowcharts described below can also be implemented by using dedicated hardware.

Figure 4:
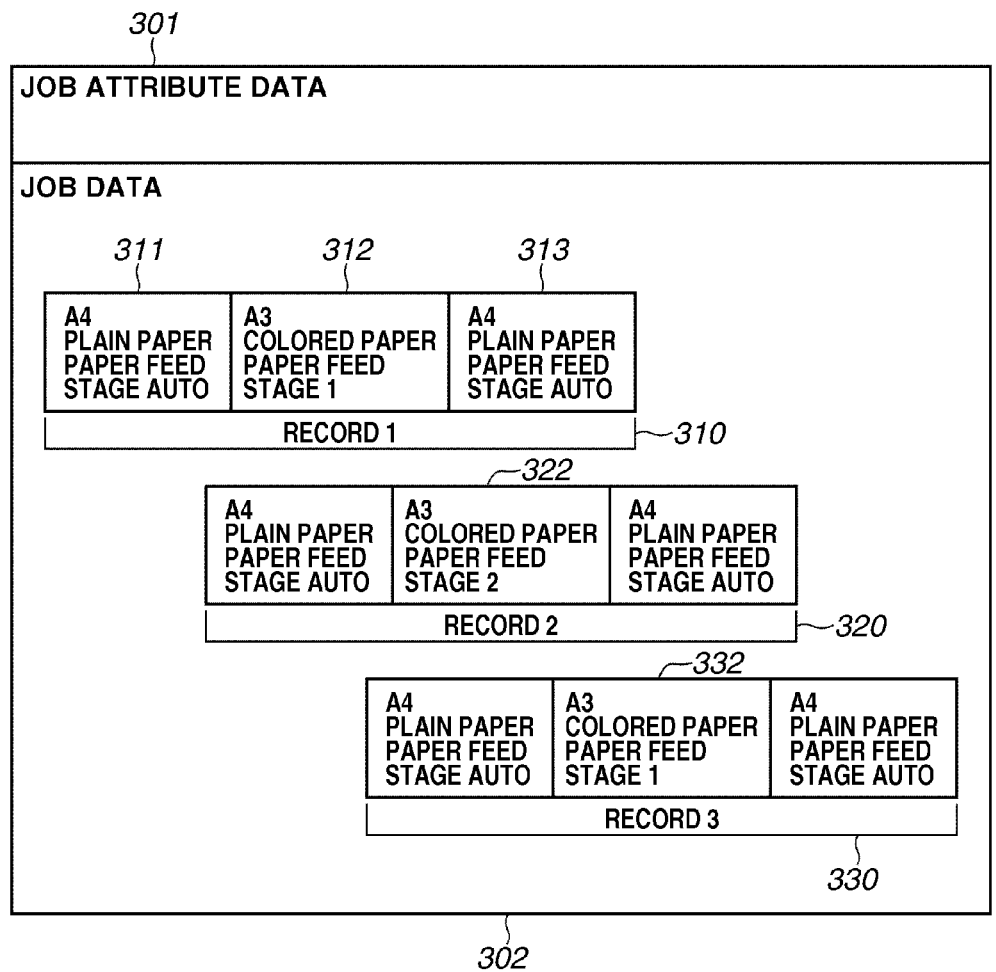
FIG. 4 illustrates an example of an internal configuration of a job.

FIG. 4 illustrates an example of an internal configuration of a job. Job attribute data 301 includes various types of data relating to the entire job. Job data 302 includes information of a plurality of records such as a record 1 (310), a record 2 (320), and a record 3 (330). Each of the records includes one or a plurality of pieces of page data. For example, the record 1 (310) includes page data (311, 312, and 313). Each page data includes information about paper of each page. For example, the information includes information about attributes of paper such as a paper size, a medium type, and a paper feed stage.

Figure 5:
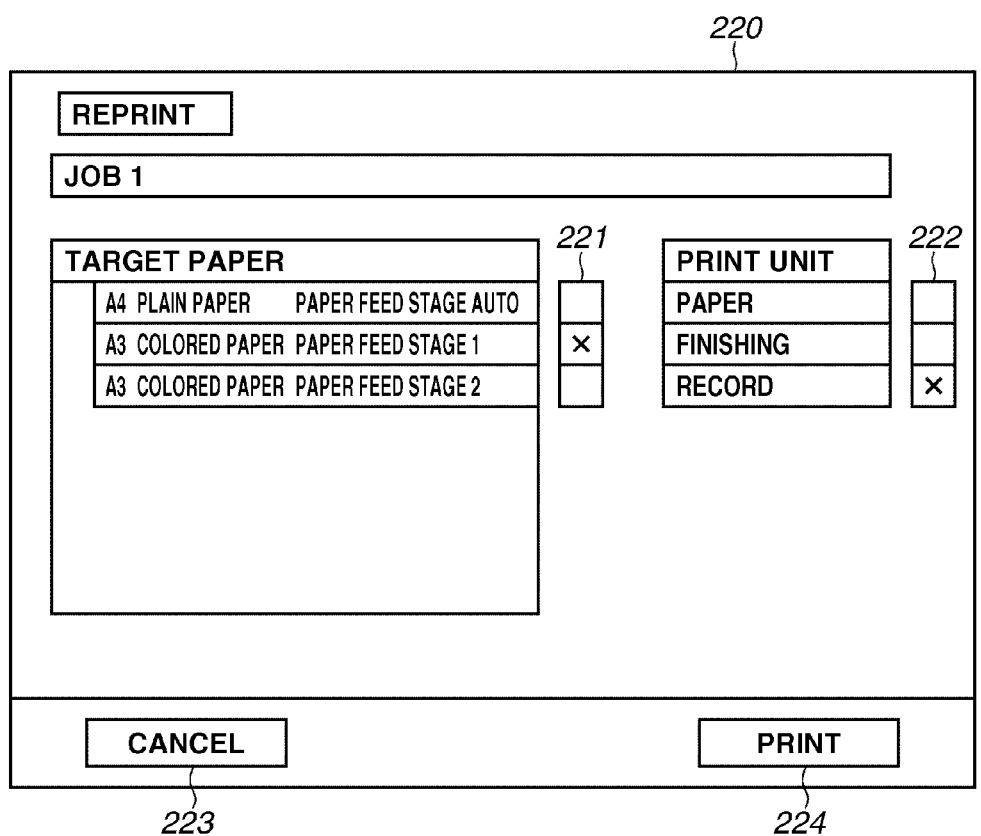
FIG. 5 illustrates an example of a user interface (UI).

FIG. 5 illustrates an example of a UI (reprint screen 220) for instructing reprint. The reprint screen 220 is displayed on the UI panel 200. A checkbox 221 is used to specify information associated with the paper to be used in the print processing. A checkbox 222 is used to specify information about a print unit to be used in the print processing. A cancel button 223 is used to cancel the reprint processing. A print button 224 is used to start print processing (reprint) using details specified on the reprint screen 220.

Figure 6:
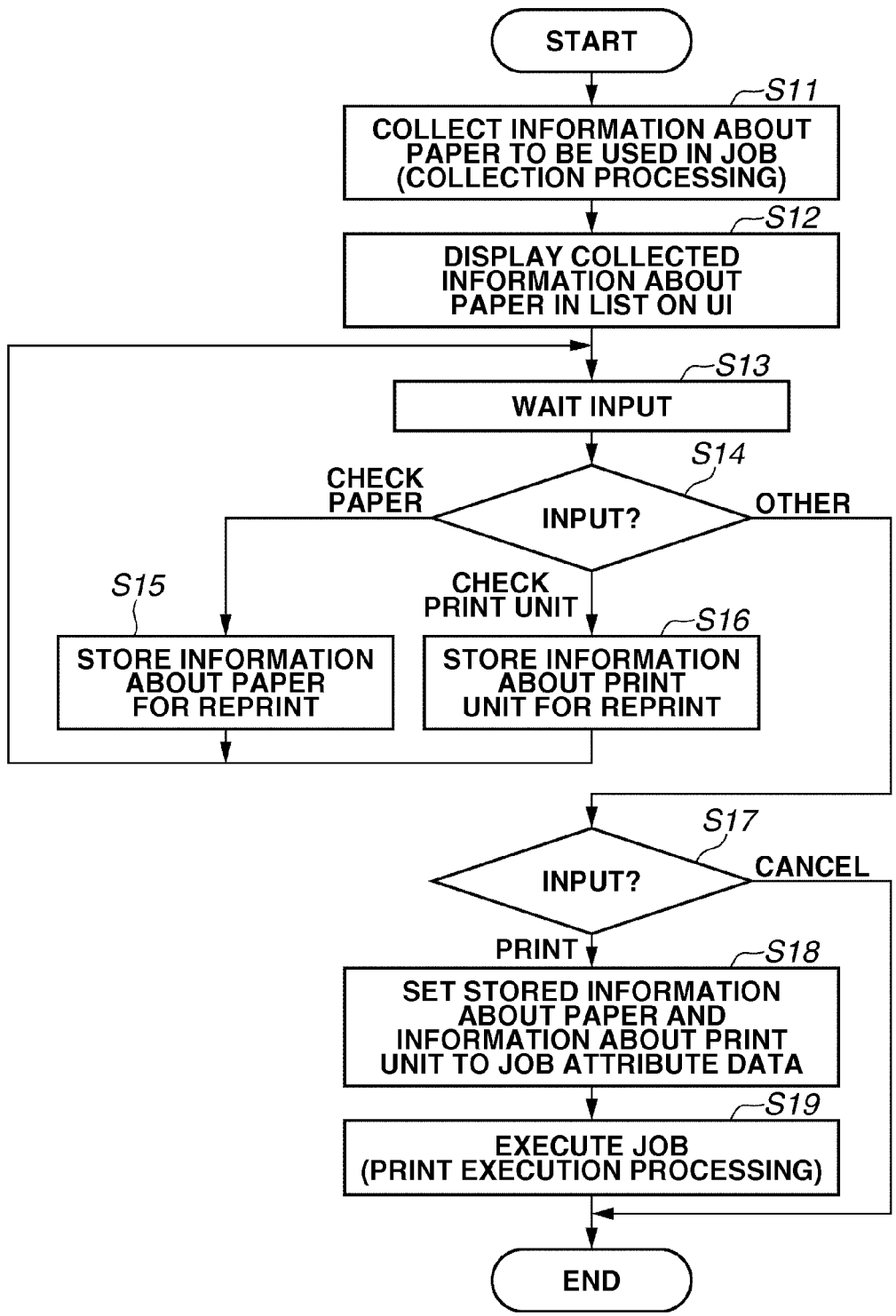
FIG. 6 illustrates an example of a flowchart in reception processing.

FIG. 6 illustrates an example of a flowchart relating to reception processing for the UI control unit 120 that receives an instruction of reprint in the printing apparatus 1000. The UI control unit 120 can be realized by the CPU 11, the RAM 12, the program ROM 13, the data ROM 14, and the like. In other words, the processing according to the flowchart in FIG. 6 can be implemented by executing a program relating to the flowchart in FIG. 6 stored in the program ROM 13 using the CPU 11. In the description below, with reference to the flowchart in FIG. 6, processing is described starting from when the UI control unit 120 displays, in a list form, jobs that have been printed once, where a job is selected from the list in response to a user operation.

In step S11, when a job is selected in response to a user operation on the UI panel 200, the UI control unit 120 requests the document management unit 170 to collect (collection processing) information about the paper to be used in the selected job. The information to be collected includes information about all papers that are to be used in the job, for example, insertion paper, front cover paper, back cover paper, and OHP interleaf paper. The information is gathered from the page data, and from the gathered information, the same paper feed stage, the same paper size, and the same medium type are removed (i.e., unique paper information). The collection processing is described below with reference to FIG. 7. In step S12, the UI control unit 120 displays the paper information collected in the document management unit 170 in a list form on the UI panel 200, for example, on the reprint screen 220. In step S13, the UI control unit 120 waits for an input from the UI panel 200.

In steps S14 and S17, the UI control unit 120 determines whether the input is transmitted. If the UI control unit 120 determines that the checkbox 221 on the reprint screen 220 is checked (CHECK PAPER in step S14), more specifically, the UI control unit 120 determines that a specification of the paper to be used in reprint is received in response to the user operation, in step S15, the UI control unit 120 stores the information of the specified paper in the RAM 12. If the UI control unit 120 determines that the checkbox 222 is checked (CHECK PRINT UNIT in step S14), more specifically, if the UI control unit 120 determines that the specification of a print unit in reprint is received in response to the user operation, in step S16, the UI control unit 120 stores the information of the specified print unit in the RAM 12. If the UI control unit 120 determines that the cancel button 223 for inputting another request is pressed (OTHER in step S14), more specifically, if the UI control unit 120 receives an instruction to cancel the reprint processing in response to the user operation (CANCEL in step S17), the reception processing is ended. If the UI control unit 120 determines that the print button 224 for inputting another request is pressed (PRINT in step S17), more specifically, if the UI control unit 120 receives an instruction to reprint in response to the user operation, subsequently, the processing in step S18 is performed.

In step S18, the UI control unit 120 sets the paper information and the print unit information stored in the RAM 12 to job attribute data of the selected job via the document management unit 170. In step S19, the UI control unit 120 requests the job control unit 110 to execute (print execution processing) the job of reprint, and ends the processing. The print execution processing is described below with reference to FIG. 8.

Figure 7:
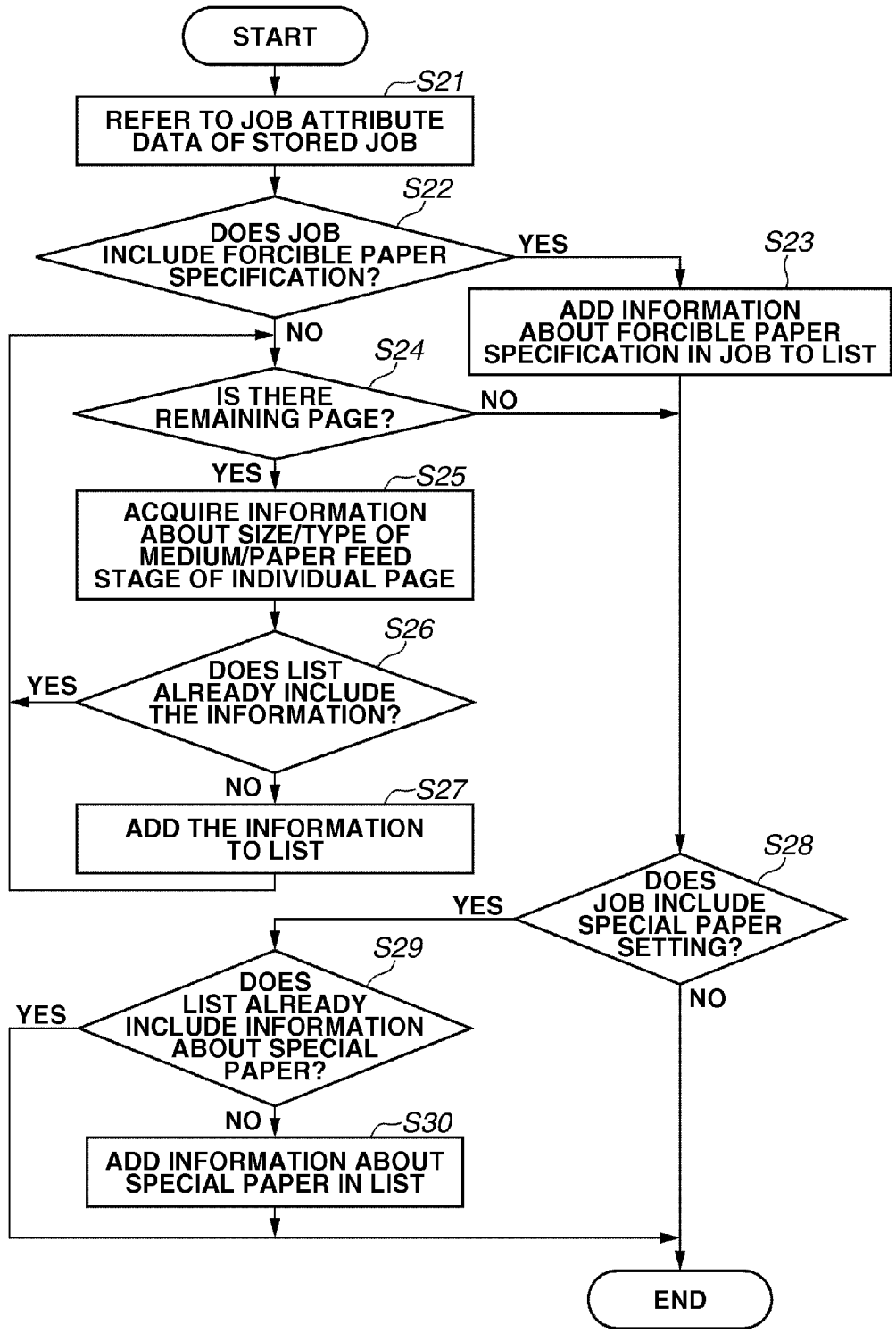
FIG. 7 illustrates an example of a flowchart in collection processing.

FIG. 7 illustrates an example of a flowchart relating to the collection processing performed by the document management unit 170 in the printing apparatus 1000. The document management unit 170 can be realized by the CPU 11, the RAM 12, the program ROM 13, the data ROM 14, and the like. In other words, the processing according to the flowchart in FIG. 7 can be implemented by the CPU 11 executing a program relating to the flowchart in FIG. 7 stored in the program ROM 13.

In step S21, upon reception of the request of collection from the UI control unit 120, the document management unit 170 refers to the job attribute data of the selected job. In step S22, the document management unit 170 determines whether a forcible paper specification is included in the job. The specification of the forcible paper, for example, refers to the processing for printing data forcibly in one paper size even if the paper sizes of the individual pages are different from each other, or refers to allocating all pages of A4 to paper of A3 as in bookbinding. If the document management unit 170 determines that the specification of forcible paper is included (YES in step S22), in step S23, the document management unit 170 adds the information of the forcible paper in the job to the data (a collection list for collecting the information about the paper) of the paper to be used, and performs processing in step S28. If the document management unit 170 determines that the specification of forcible paper is not included (NO in step S22), the document management unit 170 performs the processing in step S24.

In step S24, the document management unit 170 determines whether there is a page (remaining page) that is not processed from among the pages in the job. If the document management unit 170 determines that a remaining page exists (YES in step S24), the document management unit 170 performs the processing in step S25. If the document management unit 170 determines that no remaining pages exist (NO in step S24), the document management unit 170 performs the processing in step S28. In step S25, the document management unit 170 acquires the information (information of the paper size, the medium size, and the paper feed stage) about the paper from the page data of the pages to be processed. In step S26, the document management unit 170 determines whether the information about the paper of the same combination is already included in the collection list. If the document management unit 170 determines that the information about the paper of the same combination is not included in the collection list (NO in step S26), in step S27, the document management unit 170 adds the paper information to the collection list. Then, the document management unit 170 performs the processing in step S24. If the document management unit 170 determines that the information is included in the collection list (NO in step S26), the document management unit 170 performs the processing in step S24. In other words, the document management unit 170 performs similar processing with respect to a next page in the all cases, and continues the processing from step S24 to 27 until the document management unit 170 determines that the processing has been performed on all pages.

In step S28, the document management unit 170 determines whether special paper is set to the job. The special paper is paper that is not included in the pages of the text, for example, OHP interleaf paper, front cover paper, back cover paper, and insertion paper. In step S28, if the document management unit 170 determines that special paper is set (YES in step S28), the document management unit 170 performs processing in step S29. If the document management unit 170 determines that special paper is not set (NO in step S28), the document management unit 170 ends the collection processing. In step S29, the document management unit 170 determines whether information of the special paper is included in the list for collection. If the document management unit 170 determines that the information is not included in the list (NO in step S29), in step S30, the document management unit 170 adds the information of the special paper to the list for collection, and ends the collection processing. If the document management unit 170 determines that the information is included in the list (YES in step S29), the document management unit 170 ends the collection processing.

In the job example illustrated in FIG. 4, information is provided to the record 1 (310) that three pages of "A4/plain paper/paper feed stage AUTO", "A3/colored paper/paper feed stage 1", and "A4/plain paper/paper feed stage AUTO", are printed on one side of the paper respectively. Similarly, information is provided to the second page of the record 2 (320) that a page of "A3/colored paper/paper feed stage 2" is printed on one side of the paper, and information is provided to the second page of the record 3 (330) that a page of "A3/colored paper/paper feed stage 1" is printed on one side of the paper. If the above-described collection processing is performed on such a job, the paper information (A4/plain paper/paper feed stage AUTO) of the page 311, the paper information (A3/colored paper/paper feed stage 1) of the page 312, and the paper information (A3/colored paper/paper feed stage 2) of the page 332 is collected. In other words, in the list for collection, the information about the paper to be used in the reprint is collected by removing the same information about the paper from the information about the paper of the job.

Figure 8:
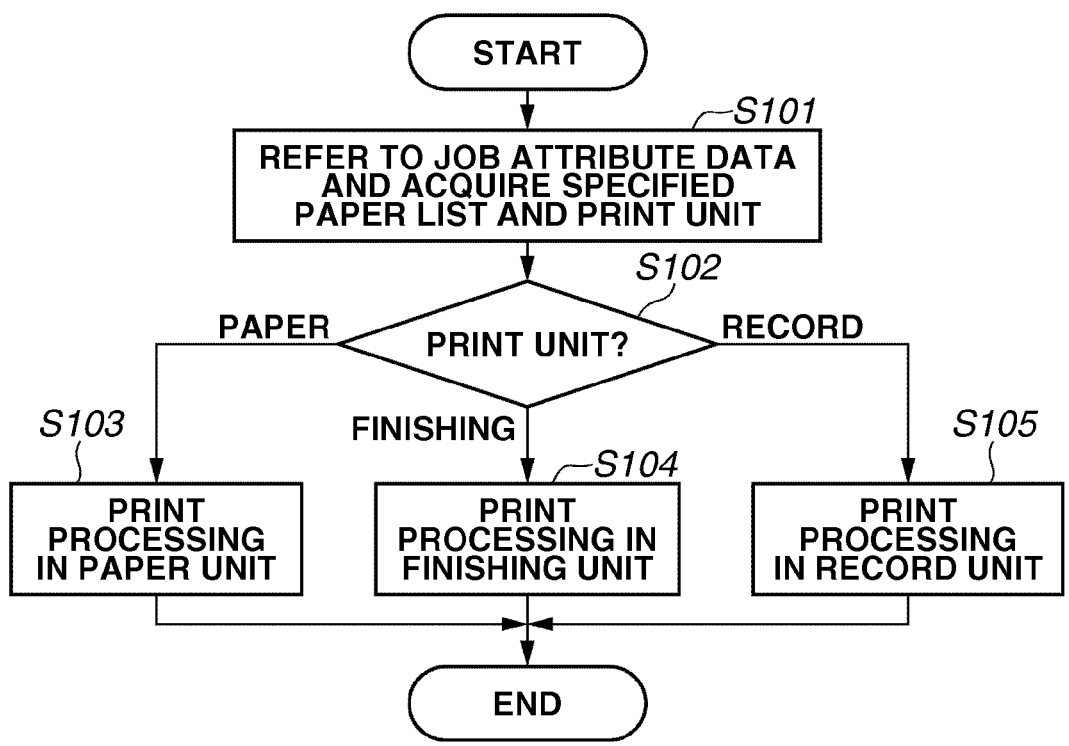
FIG. 8 illustrates an example of a flowchart in print execution processing.

FIG. 8 illustrates an example of a flowchart relating to the print execution processing performed by the job control unit 110 in the printing apparatus 1000. The job control unit 110 can be realized by the CPU 11, the RAM 12, the program ROM 13, the data ROM 14, and the like. In other words, the processing according to the flowchart in FIG. 8 can be implemented by the CPU 11 executing a program relating to the flowchart in FIG. 8 stored in the program ROM 13. The job control unit 110 performs the processing in step S101 upon reception of the instruction for executing the printing processing of the job from the UI control unit 120 in step S19 in FIG. 6.

In step S101, the job control unit 110 refers to the job attribute data of the selected job, and acquires the paper (specified paper) to be used in the reprint processing and the print unit (that is, the information about the paper and the information of the print unit). In step S102, the job control unit 110 determines the print unit. If the job control unit 110 determines that the print unit is a paper unit (PAPER in step S102), in step S103, the job control unit 110 performs the print processing by the paper unit, and ends the print execution processing. If the job control unit 110 determines that the print unit is a finishing unit (FINISHING in step S102), in step S104, the job control unit 110 performs the print processing by the finishing unit, and ends the print execution processing. If the job control unit 110 determines that the print unit is a record unit (RECORD in step S102), in step S105, the job control unit 110 performs the print processing by the record unit, and ends the print execution processing. If a plurality of kinds of specified paper is specified, the job control unit 110 similarly performs the processing from S102 to S105 on the individual specified paper. The individual print processing is described below with reference to FIGS. 9, 10, and 11.

Figure 9:
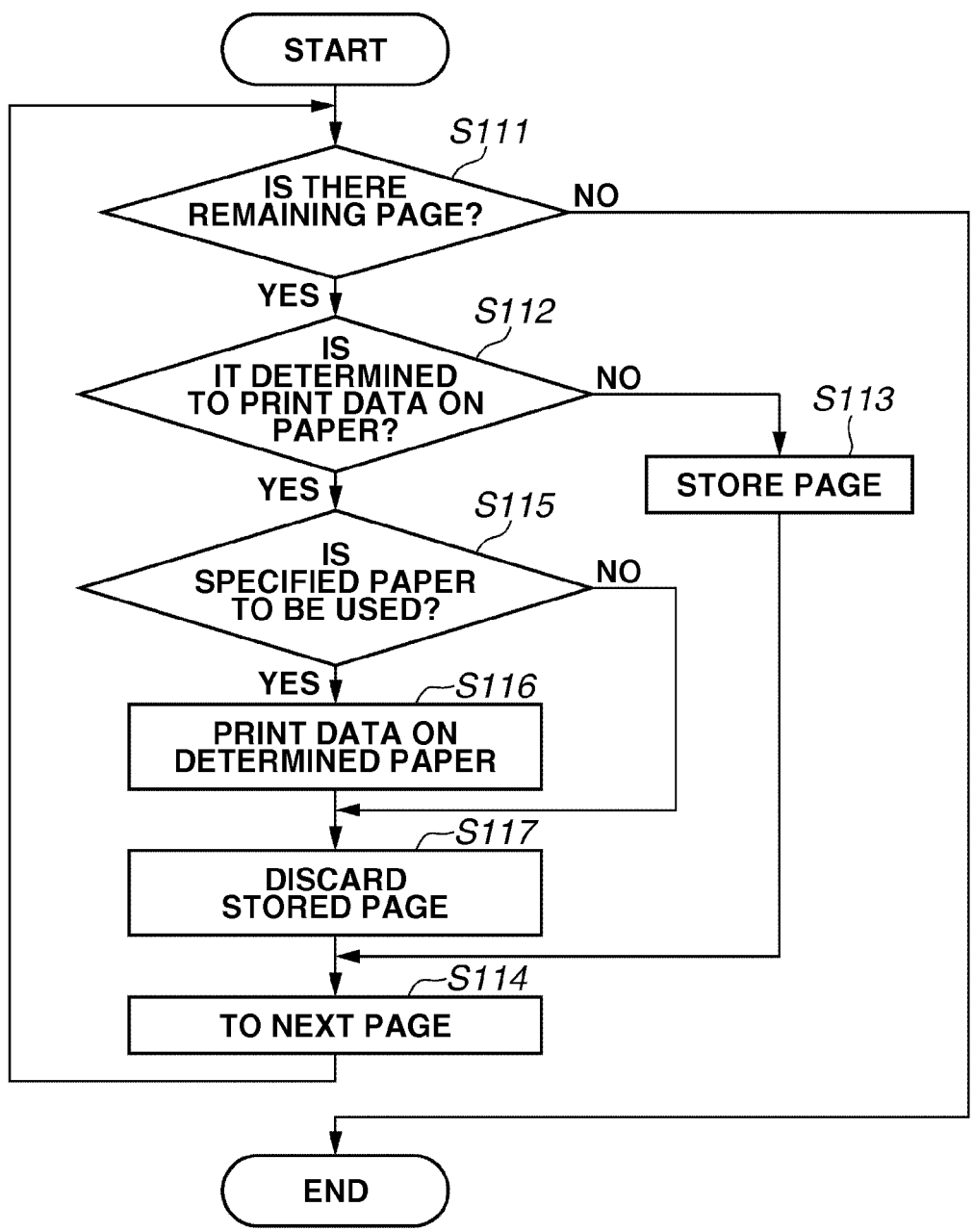
FIG. 9 illustrates an example of a flowchart in print processing.

FIG. 9 illustrates an example of a flowchart relating to the print processing by the paper unit performed by the job control unit 110 in the printing apparatus 1000. In step S111, the job control unit 110 determines whether there is a page (remaining page) that is not processed among the pages of the job. If the job control unit 110 determines that a remaining page exists (YES in step S111), the job control unit 110 performs the processing in step S112. If the job control unit 110 determines that no remaining pages exist (NO in step S111), the job control unit 110 ends the print processing. It is assumed that the job control unit 110 reads the data from the top page.

In step S112, the job control unit 110 determines whether the print processing of the page data to be processed on the paper is fixed. For example, in a case of two-sided printing, the job control unit 110 determines whether the data for both sides of the paper is provided, and in a case of bookbinding, the job control unit 110 determines whether the data of four pages is provided. If the job control unit 110 determines that the print processing is not fixed (NO in step S112), in step S113, the job control unit 110 stores the page to be processed in the RAM 12. Then, the job control unit 110 performs the processing in step S114. If the job control unit 110 determines that the print processing is fixed (YES in step S112), the job control unit 110 performs the processing in step S115. In step S115, the job control unit 110 compares the information about the paper and determines whether the fixed paper is the paper (specified paper) to be used in reprint set to the job attribute data. If the job control unit 110 determines that the paper is the specified paper (YES in step S115), in step S116, the job control unit 110 performs the printing processing on the fixed paper via the printer control unit 150. Next, the job control unit 110 performs the processing in step S117. If the job control unit 110 determines that the paper is not the specified paper (NO in step S115), the job control unit 110 performs the processing in step S117. In step S117, if the RAM 12 stores a page, the job control unit 110 discards the stored page. The job control unit 110 then performs the processing in step S114. In step S114, the job control unit 110 changes the processing target to a next page, and performs the processing in step S111.

Figure 10:
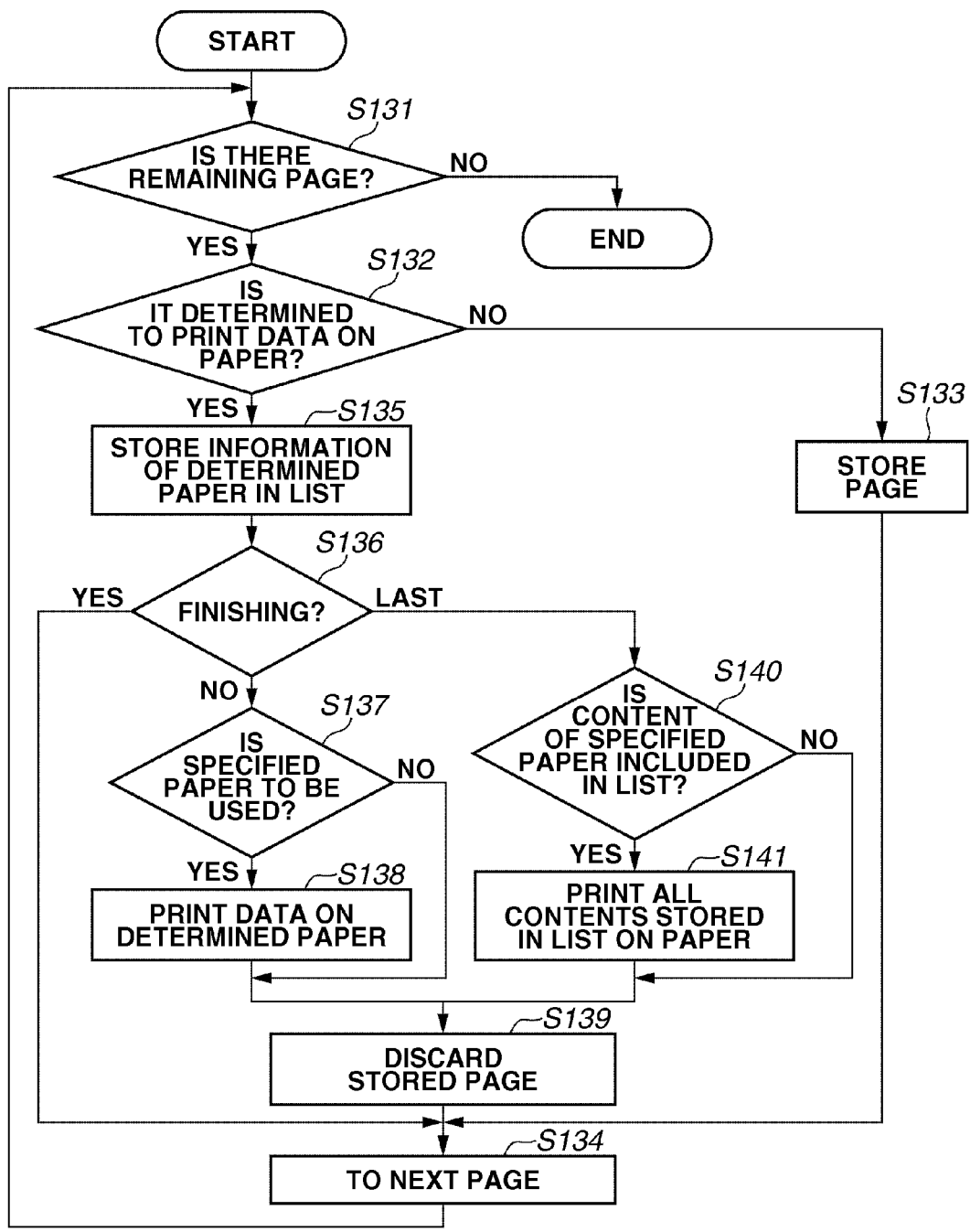
FIG. 10 illustrates an example of a flowchart in print processing.

FIG. 10 illustrates an example of a flowchart relating to the print processing by the finishing unit performed by the job control unit 110 in the printing apparatus 1000. In step S131, the job control unit 110 determines whether there is a page (remaining page) that is not processed from among the pages of the job. If the job control unit 110 determines that a remaining page exists (YES in step S131), the job control unit 110 performs the processing in step S132. If the job control unit 110 determines that no remaining pages exist (NO in step S131), the job control unit 110 ends the print processing. It is assumed that the job control unit 110 reads the data from the top page. In step S132, the job control unit 110 determines whether the print processing of the page data to be processed on the paper is fixed. If the job control unit 110 determines that the printing is not fixed (NO in step S132), in step S133, the job control unit 110 stores the page to be processed in the RAM 12. The job control unit 110 then performs the processing in step S134. If the job control unit 110 determines that the printing is fixed (YES in step S132), the job control unit 110 performs the processing in step S135.

In step S135, the job control unit 110 stores the details about the fixed paper in the list for storage. In step S136, the job control unit 110 determines whether the fixed paper is paper on which the finishing processing is to be performed. If the job control unit 110 determines that the paper is the paper to be processed, the job control unit 110 determines whether the paper is middle paper or last paper. If the job control unit 110 determines that the paper is the paper on which the finishing processing is to be performed and the paper is not the last paper (YES in step S136), the job control unit 110 performs the processing in step S134. If the job control unit 110 determines that the paper is the paper on which the finishing processing is not to be performed (NO in step S136), in step S137, the job control unit 110 compares the information about the paper and determines whether the fixed paper is the specified paper. If the job control unit 110 determines that the paper is the specified paper (YES in step S137), in step S138, the job control unit 110 performs the print processing on the fixed paper via the printer control unit 150. Next, the job control unit 110 performs the processing in step S139. If the job control unit 110 determines that the paper is not the specified paper (NO in step S137), the job control unit 110 performs the processing in step S139.

If the job control unit 110 determines that the paper is the paper on which the finishing processing is to be performed and the paper is the last paper (LAST in step S136), in step S140, the job control unit 110 compares the information about the paper and determines whether the list for storage includes data that uses the specified paper. If the job control unit 110 determines that the list includes the data that uses the specified paper (YES in step S140), in step S141, the job control unit 110 performs the printing processing on all papers stored in the list for storage via the printer control unit 150. The job control unit 110 then performs the processing in step S139. If the job control unit 110 determines that the list does not include the data that uses the specified paper (NO in step S140), the job control unit 110 performs the processing in step S139. In step S139, the job control unit 110 discards the contents of the paper in the list for storage and pages associated with the contents and stored in the RAM 12, and performs the processing in step S134. In step S134, the job control unit 110 changes the processing target to a next page, and performs the processing in step S131.

Figure 11:
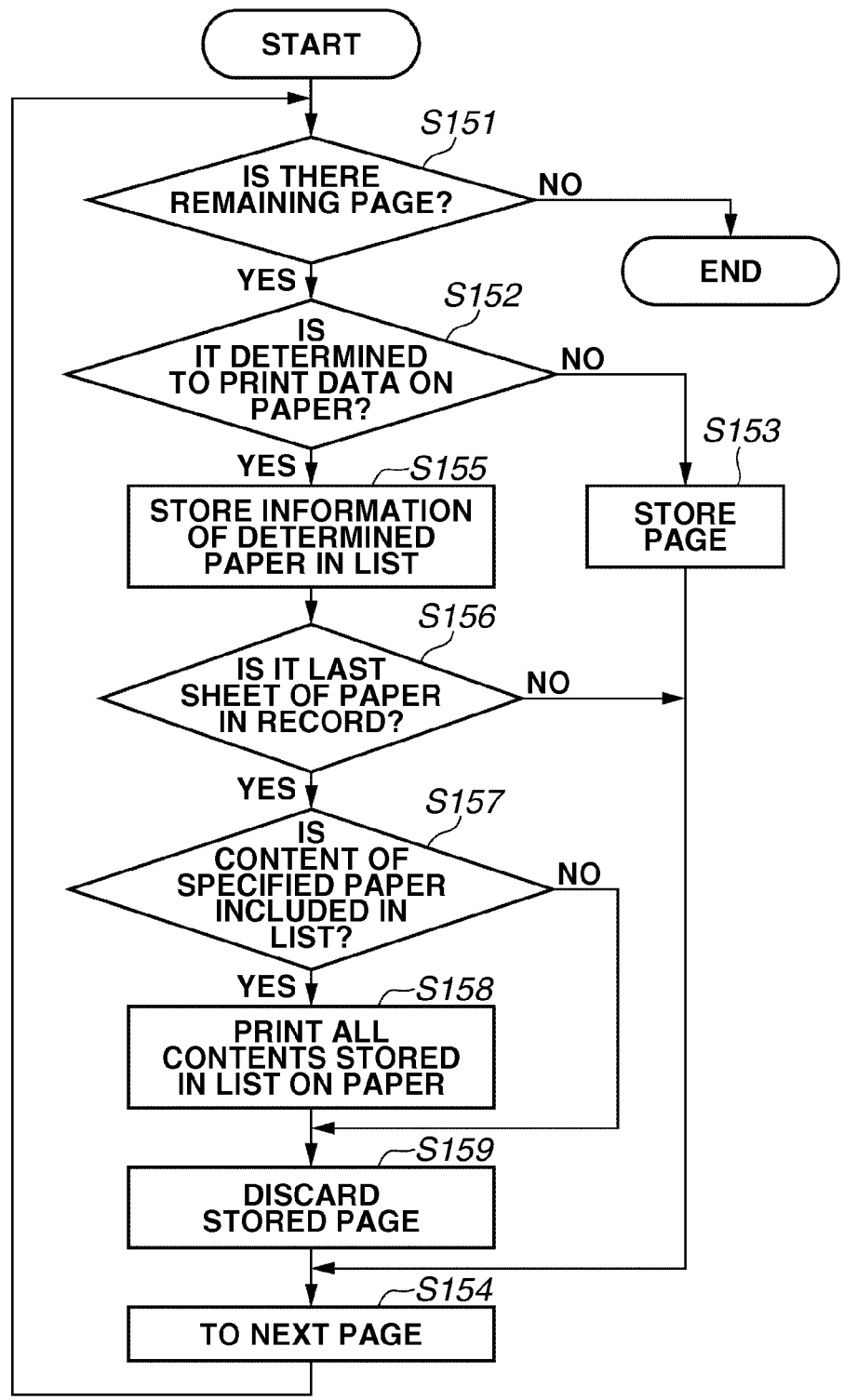
FIG. 11 illustrates an example of a flowchart in print processing.

FIG. 11 illustrates an example of a flowchart relating to the print processing by the record unit performed by the job control unit 110 in the printing apparatus 1000 according to the present exemplary embodiment. In step S151, the job control unit 110 determines whether there is a page (remaining page) that is not processed from among the pages in the job. If the job control unit 110 determines that a remaining page exists (YES in step S151), the job control unit 110 performs the processing in step S152. If the job control unit 110 determines that no remaining pages exist (NO in step S151), the job control unit 110 ends the print processing. It is assumed that the job control unit 110 reads the data from the top page. In step S152, the job control unit 110 determines whether the print processing of the page data to be processed on the paper is fixed. If the job control unit 110 determines that the print processing is not fixed (NO in step S152), in step S153, the job control unit 110 stores the page to be processed in the RAM 12. After that, the job control unit 110 performs the processing in step S154. If the job control unit 110 determines that the printing is fixed (YES in step S152), the job control unit 110 performs the processing in step S155.

In step S155, the job control unit 110 stores the contents about the fixed paper in the list for storage. In step S156, the job control unit 110 determines a part of the record in which the data of the fixed paper exists. If the job control unit 110 determines that the data of the fixed paper exists in the middle of the record (NO in step S156), the job control unit 110 performs the processing in step S154. If the job control unit 110 determines that the data of the fixed paper is the data of the last paper in the record (YES in step S156), the job control unit 110 performs the processing in step S157. In step S157, the job control unit 110 compares the information about the paper and determines whether the list for storage includes data that uses the specified paper. If the job control unit 110 determines that the list includes the data that uses the specified paper (YES in step S157), in step S158, the job control unit 110 performs the printing processing on all papers stored in the list for storage via the printer control unit 150. Then, the job control unit 110 performs the processing in step S159. If the job control unit 110 determines that the list does not include the data that uses the specified paper (NO in step S157), the job control unit 110 performs the processing in step S159. In step S159, the job control unit 110 discards the contents of the paper in the list for storage, and pages associated with the contents and stored in the RAM 12, and performs the processing in step S154. In step S154, the job control unit 110 changes the processing target to a next page, and performs the processing in step S151.

The above-described processing of the present exemplary embodiment will not be described with respect to a specific example. In this example, it is assumed that after printing the job illustrated in FIG. 4, it is discovered that instead of red paper, which was supposed to have been used in the paper feed stage 1, orange paper was mistakenly used. The user proceeds to place red paper in the paper feed stage 1 and open the reprint screen 220. According to the flowcharts in FIGS. 6 and 7, in step S11, the document management unit 170 collects the information about three kinds of paper of "A4/plain paper/paper feed stage AUTO", "A3/colored paper/paper feed stage 1", and "A3/colored paper/paper feed stage 2". In step S12, the UI control unit 120 displays the information as illustrated in FIG. 5. It is assumed that the user checks a box corresponding to the information about the paper of "A3/colored paper/paper feed stage 1" in the checkbox 221, checks a box corresponding to the information about the record unit in the checkbox 222 as the print unit, and presses the print button 224. In such a case, according to the flowchart in FIG. 6, the UI control unit 120 sets the information of "A3/colored paper/paper feed stage 1" as the information about the paper to be used in reprint, and the record unit as the information of the print unit, to the job attribute data (S15 and S16). In step S19, the job control unit 110 starts the print processing.

The instruction of the record unit is received, and in the print control processing in FIG. 8, in step S105, the job control unit 110 performs the print processing by the record unit. According to the flowchart in FIG. 11, in step S158, the job control unit 110 sets the record 1 (310) and the record 3 (330) to the target of the printing, and prints the two records. As an example, the three records are described. However, even if the number of records is 1000, the processing is similarly performed. In other words, the user can partially reprint the data without needing to count the number of pages. In the present exemplary embodiment, reprint is described as an example. However, since the history of the job in printing is not used, the user can issue a new job and perform the partial printing using specified paper with respect to the job. According to the above-described configuration, when the user mistakenly sets incorrect paper, by performing the reprint specifying the paper, only the part associated with the incorrect paper is reprinted. Further, in a case where it is required that data is to be printed in a unit, by specifying the unit for reprint, the data can be reprinted in the specified unit including the specified paper. As a result, only the necessary part can be reprinted, and consequently, unnecessary printing can be avoided.

In the first exemplary embodiment, in the case where the information (an example of the paper feeding unit information) of a paper feed stage that feeds the paper requested by a page is "paper feed stage AUTO", the information is collected as the "paper feed stage AUTO". For example, there is a case where a job requests "A3/colored paper/paper feed stage 1" and "A3/colored paper/paper feed stage AUTO", and as a result, the paper is fed from the same paper feed stage 1. In such a case, when incorrect paper is used in the paper feed stage 1, the user has to specify two pieces of information of "paper feed stage 1" and "paper feed stage AUTO" in the specification of the paper to be used in reprint. In a second exemplary embodiment, a addressing this is described. In the second exemplary embodiment, the same reference numerals are applied to a configuration similar to that in the first exemplary embodiment, and their descriptions are omitted herein.

Figure 12:
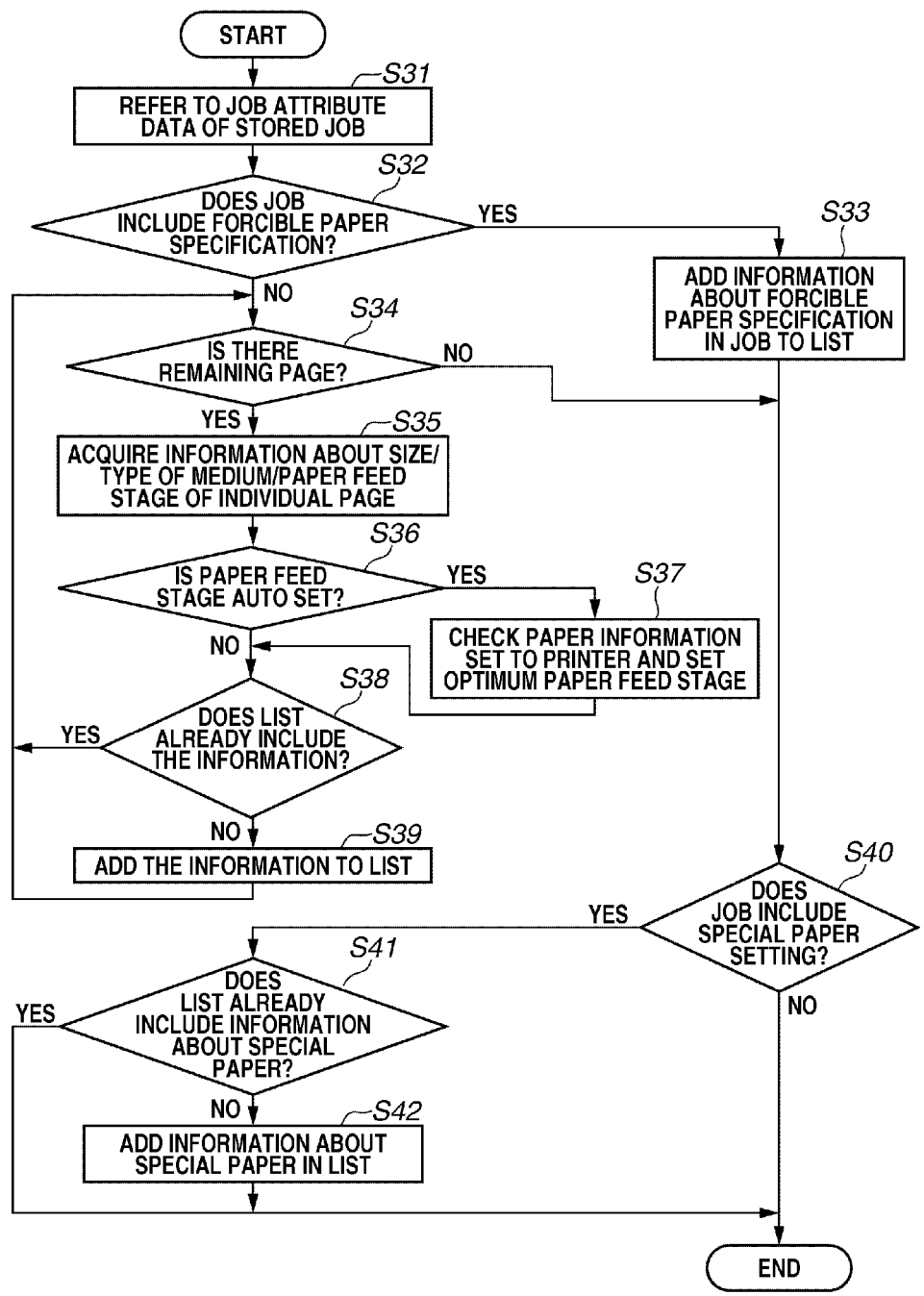
FIG. 12 illustrates an example of a flowchart in collection processing.

FIG. 12 illustrates an example of a flowchart relating to the collection processing performed by the document management unit 170 in the printing apparatus 1000 according to the second exemplary embodiment. In step S31, upon reception of the request for the collection from the UI control unit 120, the document management unit 170 refers to the job attribute data of the selected job. In step S32, the document management unit 170 determines whether a forcible paper specification is included in the job. If the document management unit 170 determines that the forcible paper specification is included in the job (YES in step S32), in step S33, the document management unit 170 adds the information of the forcible paper in the job to the list for collection. After that, the document management unit 170 performs the processing in step S40. If the document management unit 170 determines that the forcible paper specification is not included (NO in step S32), the document management unit 170 performs processing in step S34.

In step S34, the document management unit 170 determines whether there is a page (remaining page) that is not processed from among the pages in the job. If the document management unit 170 determines that a remaining page exists (YES in step S34), the document management unit 170 performs the processing in step S35. If the document management unit 170 determines that no remaining page(s) exist (NO in step S34), the document management unit 170 performs the processing in step S40. In step S35, the document management unit 170 acquires the information (information of the paper size, the medium size, and the paper feed stage) of the paper from the page data of the page to be processed. In a case where the information of the paper feed stage specifies "paper feed stage AUTO" (that is, no specific paper feed stage is specified), if a paper feed stage that stores the paper corresponding to the paper size and the medium type exists, in some cases, it may be specified to feed the paper from that paper feed stage.

In step S36, the document management unit 170 determines whether the information of the paper feed stage specifies "paper feed stage AUTO". If the document management unit 170 determines that the information of the paper feed stage specifies "paper feed stage AUTO" (YES in step S36), the document management unit 170 performs the processing in step S37. If the document management unit 170 determines that the information of the paper feed stage does not specify "paper feed stage AUTO" (NO in step S36), the document management unit 170 performs the processing in step S38. In step S37, the document management unit 170 acquires information (an example of the set information) of the paper set to the paper feed stages (161 to 165) of the actual printer engine 160 via the printer control unit 150, and selects an optimum paper feed stage. The document management unit 170 then performs the processing in step S38. Usually, in the printing apparatus, there is a rule to select a paper feed stage in order of priority depending on the configuration of the apparatus when the information of the paper feed stage specifies "paper feed stage AUTO". Consequently, the document management unit 170 determines information of an optimum paper feed stage according to the above-described rule.

In step S38, the document management unit 170 determines whether the information about the paper of the same combination is already contained in the collection list. If the document management unit 170 determines that the information about the paper of the same combination is not included in the list for collection (NO in step S38), in step S39, the document management unit 170 adds the paper information to the list for collection. Next, the document management unit 170 performs the processing in step S34. If the document management unit 170 determines that the information is included in the list for collection (YES in step S38), the document management unit 170 performs the processing in step S34. The processing after step S40 is similar to that after step S28 in FIG. 7, and consequently, a description thereof is omitted herein.

In the processing in steps S115, S137, and S157, when the job control unit 110 compares the paper in each page of the job with the specified paper, if "paper feed stage AUTO" is specified as the information of the paper feed stage of the page, the job control unit 110 replaces the information with the information of an optimum paper feed stage from which the paper is actually fed, and makes a comparison. According to the above-described configuration, the information about the paper is not collected as the information of "paper feed stage AUTO" that indicates that the paper feed stage is automatically determined, but the information is uniquely collected as the information of an actual paper feed stage. Accordingly, the user can perform the reprint processing by specifying one type of paper (only the paper feed stage in which wrong paper is set) even if "paper feed stage AUTO" is set to the job.

Figure 13:
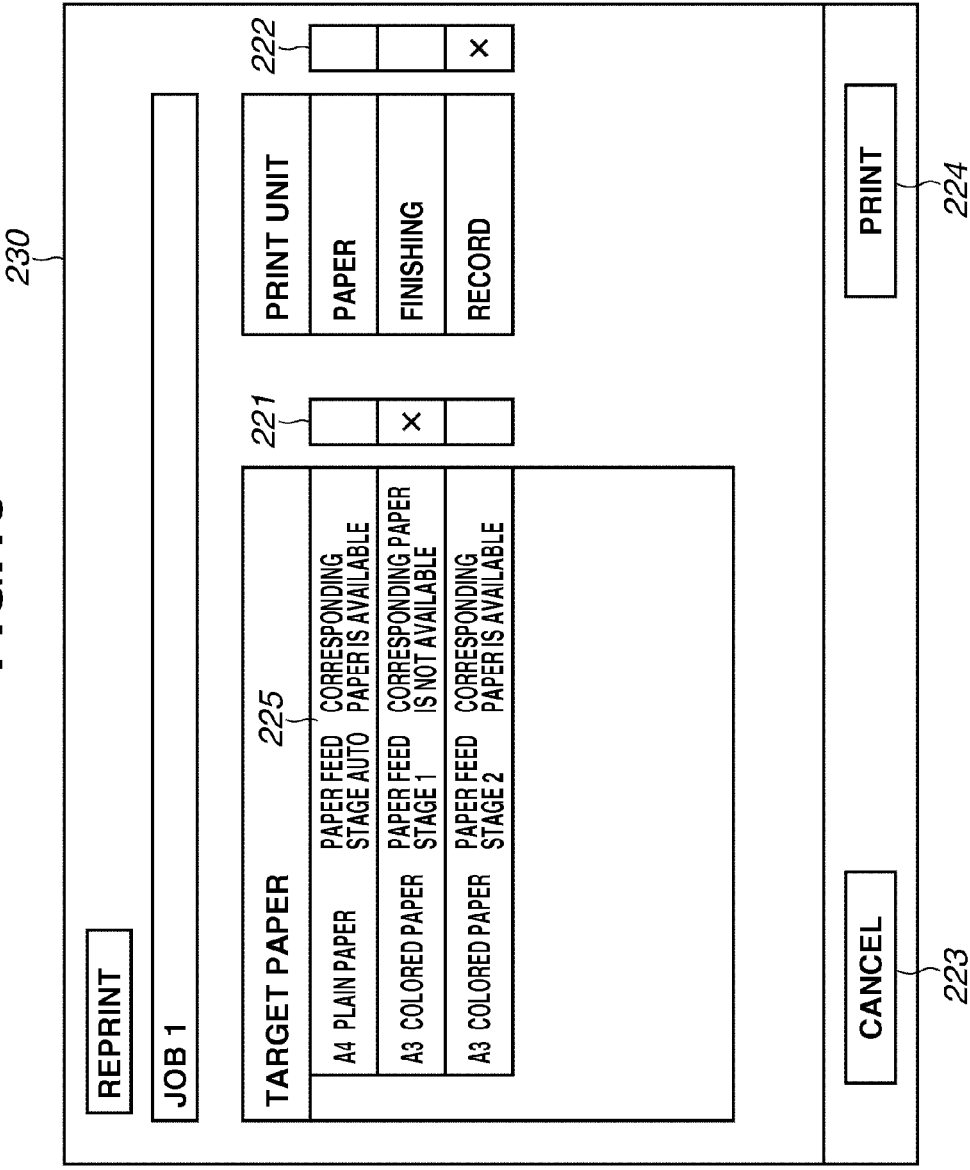
FIG. 13 illustrates an example of a UI.

In the first and second exemplary embodiments, if corresponding paper is not provided among types of paper to be used in reprint, a condition for the reprint processing may be changed from the initial condition. In a third exemplary embodiment addresses this. In the third exemplary embodiment, the same reference numerals are applied to a configuration similar to the first exemplary embodiment, and thus, their descriptions are omitted herein. FIG. 13 illustrates an example (reprint screen 230) of a UI for instructing reprint. The reprint screen 230 is displayed on the UI panel 200. A display area 225 displays collected information about paper. Specifically, on the display area 225, information indicating whether paper is set in a paper feed stage is displayed. Other configurations are similar to those in the reprint screen 220 in FIG. 5, and thus, their descriptions are omitted herein.

Figure 14:
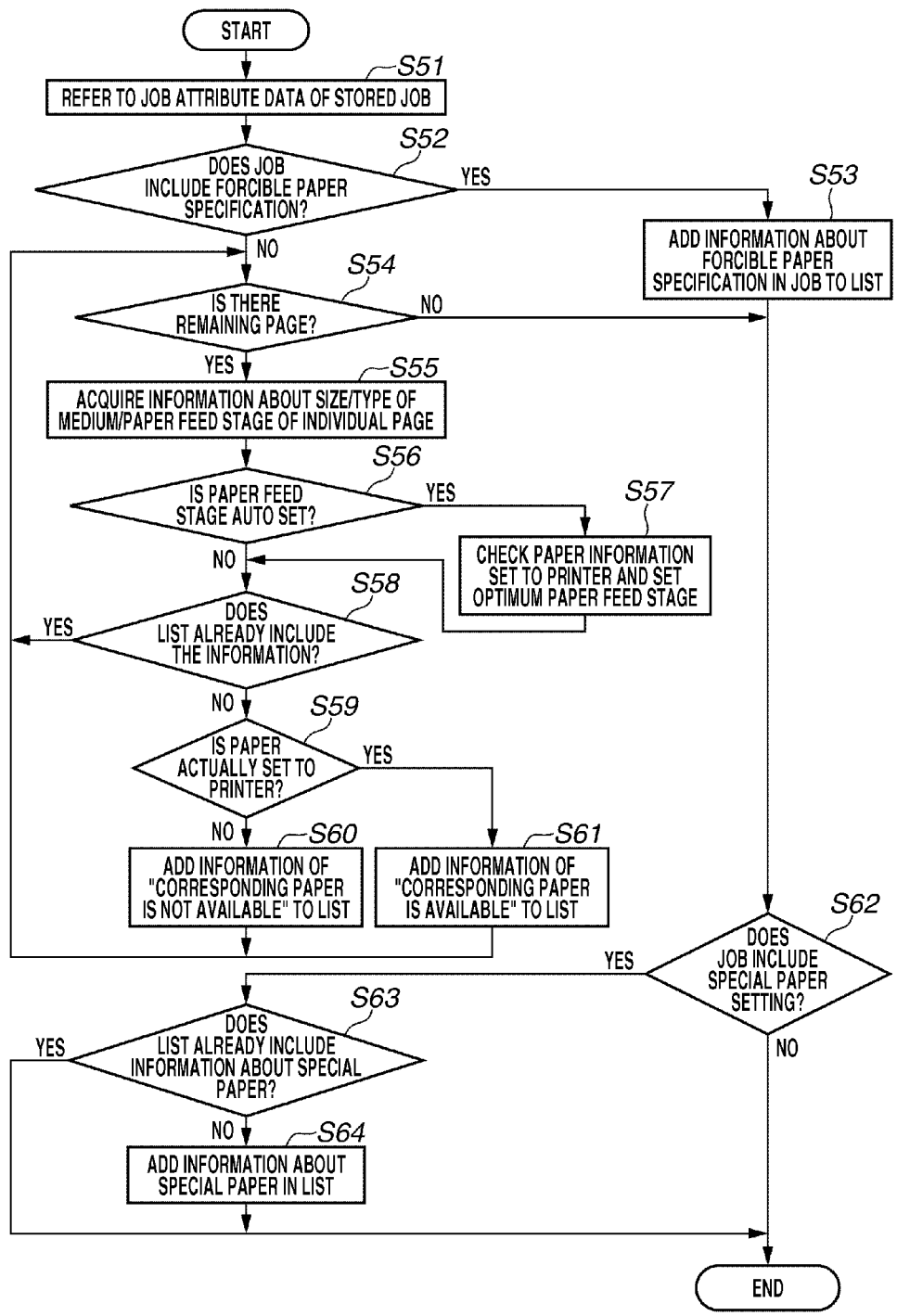
FIG. 14 illustrates an example of a flowchart in collection processing.

FIG. 14 illustrates an example of a flowchart relating to the collection processing performed by the document management unit 170 in the printing apparatus 1000. In step S51, upon reception of the request for the collection from the UI control unit 120, the document management unit 170 refers to the job attribute data of the selected job. In step S52, the document management unit 170 determines whether a forcible paper specification is included in the job. If the document management unit 170 determines that the forcible paper specification is included in the job (YES in step S52), in step S53, the document management unit 170 adds the information of the forcible paper specification to the list for collection. The document management unit 170 then performs the processing in step S62.

If the document management unit 170 determines that the forcible paper specification is not included in the collection list (NO in step S52), the document management unit 170 performs the processing in step S54. In step S54, the document management unit 170 determines whether there is a page (remaining page) that is not processed from among the pages in the job. If the document management unit 170 determines that the unprocessed page remains (YES in step S54), the document management unit 170 performs the processing in step S55. If the document management unit 170 determines that the unprocessed page does not remain (NO in step S54), the document management unit 170 performs the processing in step S62.

In step S55, the document management unit 170 acquires the information (information of the paper size, the medium size, and the paper feed stage) of the paper from the page data of the page to be processed. In a case where the information of the paper feed stage specifies "paper feed stage AUTO" (that is, no specific paper feed stage is specified), if a paper feed stage that stores the paper corresponding to the paper size and the medium type exists, it may be specified to feed the paper from the paper feed stage.

In step S56, the document management unit 170 determines whether the information of the paper feed stage specifies "paper feed stage AUTO". If the document management unit 170 determines that the information of the paper feed stage specifies "paper feed stage AUTO" (YES in step S56), the document management unit 170 performs the processing in step S57. If the document management unit 170 determines that the information of the paper feed stage does not specify "paper feed stage AUTO" (NO in step S56), the document management unit 170 performs the processing in step S58. In step S57, the document management unit 170 acquires information (an example of the set information) of the paper set to the paper feed stages (161 to 165) of the actual printer engine 160 via the printer control unit 150, and selects an optimum paper feed stage. Next, the document management unit 170 performs the processing in step S58.

In step S58, the document management unit 170 determines whether the information about paper of the same combination is already included in the list for collection. If the document management unit 170 determines that the information is already included in the list for collection (YES in step S58), the document management unit 170 performs the processing in step S54. If the document management unit 170 determines that the information is not included in the list for collection (NO in step S58), the document management unit 170 performs the processing in step S59.

In step S59, the document management unit 170 checks whether the paper actually exists in the paper feed stage of the printing apparatus 1000. If the document management unit 170 determines that the paper is not set in the paper feed stage (NO in step S59), in step S60, the document management unit 170 adds the information about the paper to which the information indicating that the paper is not set in the paper feed stage is attached, to the list for collection. Then, the document management unit 170 performs the processing in step S54. If the document management unit 170 determines that the paper is actually set in the paper feed stage (YES in step S59), in step S61, the document management unit 170 adds the information about the paper to which the information indicating that the paper is set in the paper feed stage is attached, to the list for collection. The document management unit 170 then performs the processing in step S54. The processing after step S62 is similar to that after step S28 in FIG. 7, thus, its description is omitted herein.

In step S12 in the flowchart in FIG. 6, in displaying the collected information about the paper on the UI, if the paper is provided, the UI control unit 120 displays "CORRESPONDING PAPER IS AVAILABLE". If the paper is not provided, the UI control unit 120 displays "CORRESPONDING PAPER IS NOT AVAILABLE". The UI control unit 120 displays the information about the paper, for example, on the display area 225 in the reprint screen 230 in FIG. 13.

With the above-described configuration, before the user gives an instruction to print, whether the paper to be used in the selected job is provided in the paper feed stage can be determined. Consequently, the risk of further using incorrect paper in the reprint processing can be reduced. The indication of the existence of the paper is effective in the first printing operation because, in addition to the incorrect paper, it is difficult to pay attention to other types of paper contained in a record unit, or a finishing unit, and as a result, it is highly possible that incorrect paper is fed and an incorrect print out is produced.

In the second exemplary embodiment, in a case where the information of a paper feed stage for the paper requested by a page is set to "paper feed stage AUTO", "paper feed stage AUTO" is assigned to the paper feed stage to be used based on the current printer state. For example, in a case where the information about the paper feed stage has already changed when the reprint processing is performed, the paper feed stage may not be the same paper feed stage used in the first printing. A fourth exemplary embodiment addresses this. In the forth exemplary embodiment, the same reference numerals are applied to a configuration similar to the first exemplary embodiment, thus, their descriptions are omitted herein.

Figure 15:
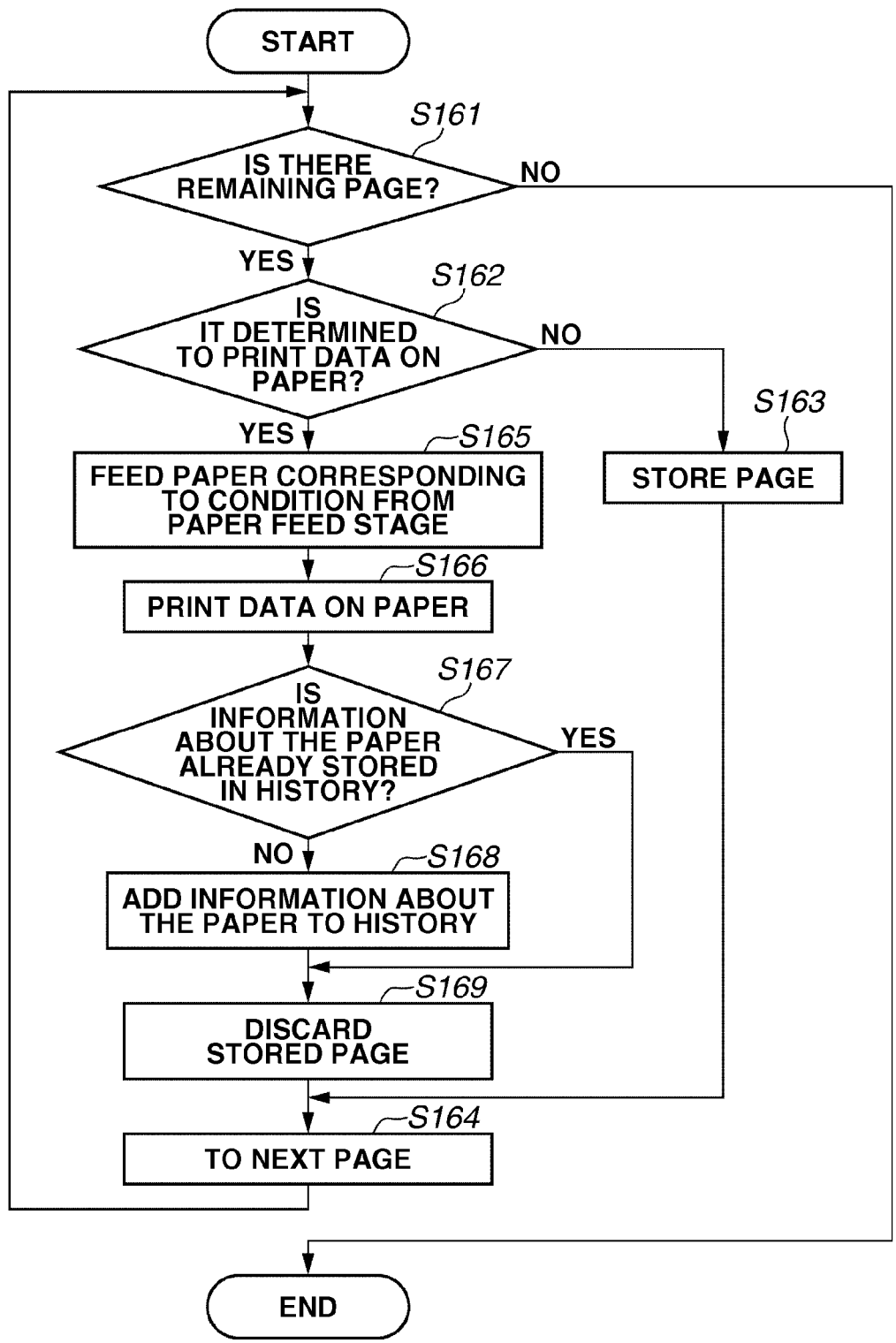
FIG. 15 illustrates an example of a flowchart in print processing.

FIG. 15 illustrates an example of a flowchart relating to the first print processing performed by the job control unit 110 in the printing apparatus 1000. In response to an instruction to execute printing processing of a job, the job control unit 110 starts the processing from the top of the page.

In step S161, the job control unit 110 determines whether there is a page (remaining page) that is not processed from among the pages in the job. If the job control unit 110 determines that an unprocessed page remains (YES in step S161), the job control unit 110 performs the processing in step S162. If the job control unit 110 determines that no unprocessed page(s) remains (NO in step S161), the job control unit 110 ends the print processing. In step S162, the job control unit 110 determines whether the printing of the page data to be processed on the paper is fixed, in other words, whether a page enough to form a sheet of paper is stored in the RAM 12. If the job control unit 110 determines that the printing is not fixed (NO in step S162), in step S163, the job control unit 110 stores the page to be processed in the RAM 12. The job control unit 110 then performs the processing in step S164. If the job control unit 110 determines that the printing is fixed (YES in step S162), the job control unit 110 performs the processing in step S165.

In step S165, the job control unit 110 instructs the printer control unit 150 to feed the paper that satisfies a condition (setting information, a rule, or the like) from the paper feed stage. In step S166, the job control unit 110 performs the print processing on the fixed paper via the printer control unit 150. In step S167, the job control unit 110 determines whether the information about the fixed paper is stored (recorded) in the print history of the job via the document management unit 170. If the job control unit 110 determines that the information is not stored (NO in step S167), in step S168, the job control unit 110 requests the document management unit 170 to add the information about the paper size, the medium type, and the paper feed stage actually feeding the paper to the print history, and store the information. The job control unit 110 then performs the processing in step S169. If the job control unit 110 determines that the information has already been stored (YES in step S167), the job control unit 110 performs the processing in step S169. In step S169, if a page has already been stored in the RAM 12, the job control unit 110 discards the stored page. Next, the job control unit 110 performs the processing in step S164. In step S164, the job control unit 110 changes the processing target to a next page, and performs the processing in step S161.

Figure 16:
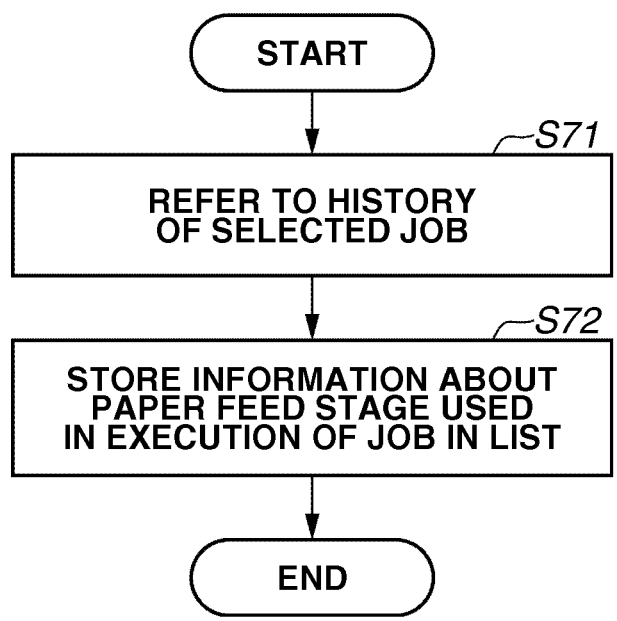
FIG. 16 illustrates an example of a flowchart in collection processing.

FIG. 16 illustrates an example of a flowchart relating to the collection processing performed by the document management unit 170 in the printing apparatus 1000. In step S71, upon reception of the request of the collection from the UI control unit 120, the document management unit 170 refers to the print history of the selected job. The print history stores the information (specifically, the information of the actually used paper feed stage) about the paper used when the job is performed first. In step S72, the document management unit 170 stores the information about the paper described in the print history, in the list for collection, and ends the collection processing.

The reception processing in FIG. 6 is similar to the first exemplary embodiment. In the processing in steps S115, S137, and S157, when the job control unit 110 compares the paper of each page of the job with the specified paper, if "paper feed stage AUTO" is specified as the information of the paper feed stage of the page, the job control unit 110 replaces that information with the information of an optimum paper feed stage from which the paper is actually fed, and makes a comparison.

According to the above-described configuration, the information about the paper is not collected as "paper feed stage AUTO" with respect to the information of the paper feed stage, but the information about the paper feed stage actually used is collected. Consequently, a situation can be prevented in which the paper feed stage is not the same as the paper feed stage that was used in the preceding printing processing. Further, in the present exemplary embodiment, the configuration for acquiring the history in the first print processing is different from the other exemplary embodiments, however, the reception processing in the UI control unit 120, the print execution processing in the job control unit 110, and the like are similar to the other exemplary embodiments.

According to the above-described exemplary embodiments, partial printing can be performed more easily.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-086583 filed Apr. 8, 2011, which is hereby incorporated by reference herein in its entirety.

What is claimed is:

1. A printing apparatus comprising:
a memory; and
a processor coupled to the memory, the processor configured to control:
a reception unit configured to receive sheet attribute information and print unit information of a job, the sheet attribute information indicating an attribute of a sheet on which printing is to be executed and the print unit information indicating which portion of the job is to be printed on the sheet that has the attribute indicated by the sheet attribute information; and
a printing unit configured to execute printing of a portion of the job indicated by the print unit information on the sheet having the attribute and not to execute printing of the portion of the job on a sheet without the attribute.

2. The printing apparatus according to claim 1, the processor further configured to control:
an acquisition unit configured to acquire from the job the sheet attribute information, wherein the reception unit is configured to display the sheet attribute information acquired by the acquisition unit, and receives information specified in response to a user operation from the sheet attribute information, as the sheet attribute information about the attribute of the sheet to be used for printing.

3. The printing apparatus according to claim 2, wherein the sheet attribute information includes paper feed unit information for specifying a paper feed unit to be used for the print processing from among a plurality of paper feed units; and
wherein the acquisition unit is configured to acquire the paper feed unit information as information for specifying one paper feed unit from among the paper feed units in a case where the paper feed unit information is information for automatically determining a paper feed unit from the paper feed units, and uniquely acquires from the job the attribute of the sheet.

4. The printing apparatus according to claim 3, wherein the reception unit is configured to determine whether the sheet is set in the paper feed unit, and if the reception unit determines that the sheet is set, the reception unit further displays information indicating that the sheet is set, and if the reception unit determines that the sheet is not set, the reception unit displays the information indicating that the sheet is not set.

5. The printing apparatus according to claim 1, wherein the processor is further configured to control:
an acquisition unit configured to acquire the sheet attribute information, wherein the reception unit displays the sheet attribute information acquired by the acquisition unit, and receives information specified in response to a user operation from the sheet attribute information as the information about the attribute of the sheet to be used in the print processing.

6. A print control method in a printing apparatus configured to perform job printing, the print control method comprising:
receiving print unit information and sheet attribute information of a job, the print unit information indicating which portion of the job is to be executed and the sheet attribute information indicating an attribute of a sheet on which printing is to be executed; and
executing printing of a portion of the job indicated by the print unit information on the sheet having the attribute, and not to execute printing of the portion of the job on a sheet without the attribute.

7. A non-transitory computer-readable storage medium configured to store a program for causing a computer perform the method of claim 6.

* * * * *